(No Model.) 3 Sheets—Sheet 1.

W. SAUNDERS.
CULTIVATOR.

No. 345,734. Patented July 20, 1886.

Attest:
Court A. Cooper
S. V. Edmonds

Inventor:
William Saunders
per Edson Bro's
Atty.

(No Model.)

W. SAUNDERS.
CULTIVATOR.

No. 345,734. Patented July 20, 1886.

Attest:
Cour.t A. Cooper
S. T. Edmonds

Inventor:
William Saunders
per Edson Bro's
attys (No Model.) 3 Sheets—Sheet 3.
W. SAUNDERS.
CULTIVATOR.
No. 345,734. Patented July 20, 1886.
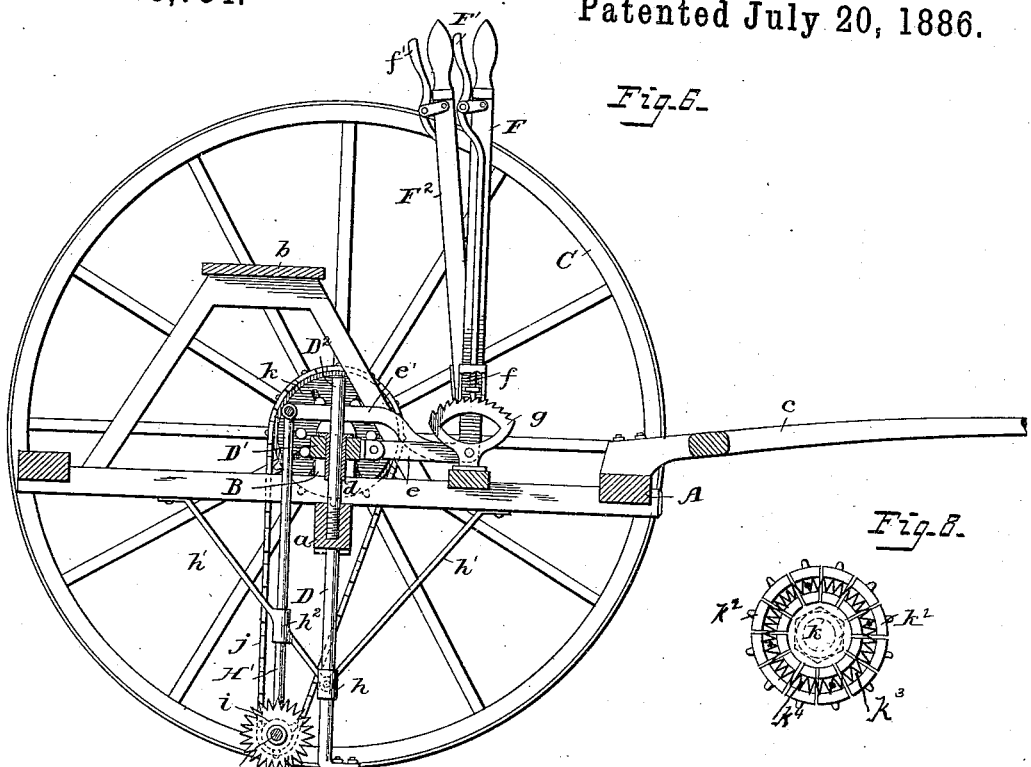
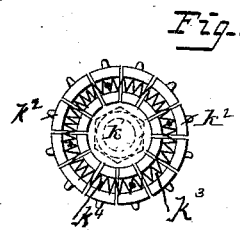
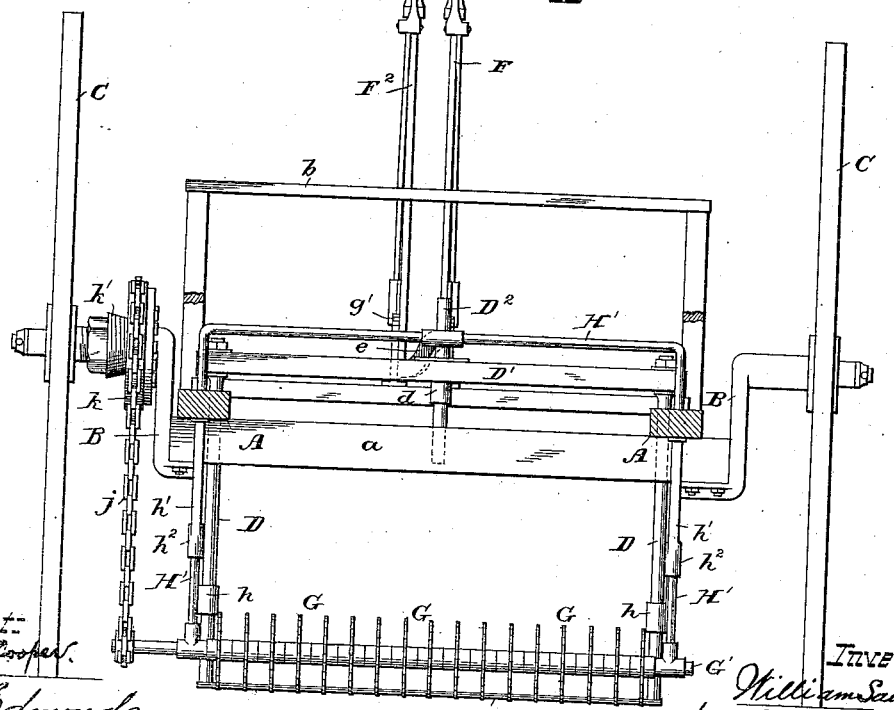
Attest:
Court A. Cooper
S.O. Edmonds
Inventor:
William Saunders
per Edson Bro
Attys.

UNITED STATES PATENT OFFICE.

WILLIAM SAUNDERS, OF WASHINGTON, DISTRICT OF COLUMBIA.

CULTIVATOR.

SPECIFICATION forming part of Letters Patent No. 345,734, dated July 20, 1886.

Application filed September 24, 1885. Serial No. 178,017. (No model.)

*To all whom it may concern:*

Be it known that I, WILLIAM SAUNDERS, a citizen of the United States, residing at Washington, in the District of Columbia, have invented certain new and useful Improvements in Cultivators, of which the following is a specification, reference being had therein to the accompanying drawings.

In cultivating the soil over the roots of growing plants, the fundamental principle governing the proper performance of the operation is, that the surface of the soil be kept clean and pulverized without tearing up and destroying the roots of the crops under cultivation. Unless the implement used is fully and thoroughly under the control of the operator, as regards depth of culture, there is a certain amount of destruction of roots—an evil in all cases to be avoided if practicable. Especially in orchards and groves of fruit-trees of all kinds it is desirable to be able to cultivate the soil without destroying surface-roots; and to these ends this invention is specially contrived, although it is equally adapted for general cultivation of the soil, the same consisting of the combinations of parts, including their construction, substantially as hereinafter set forth, and pointed out in the claims.

Figure 1:
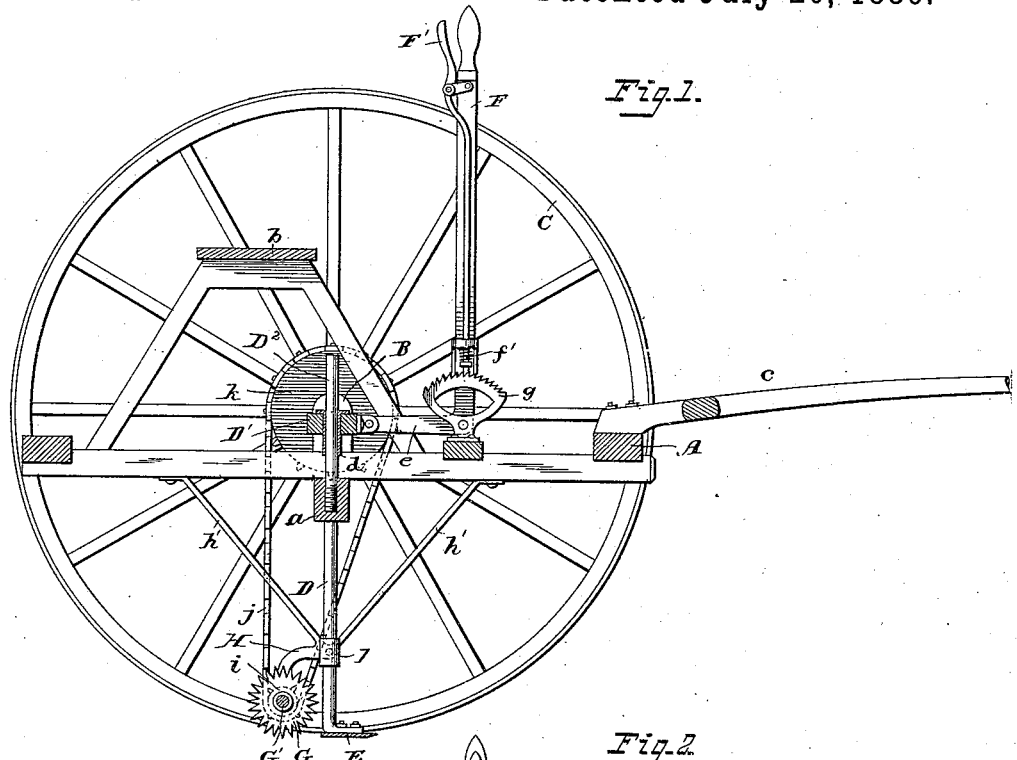
Figure 2:
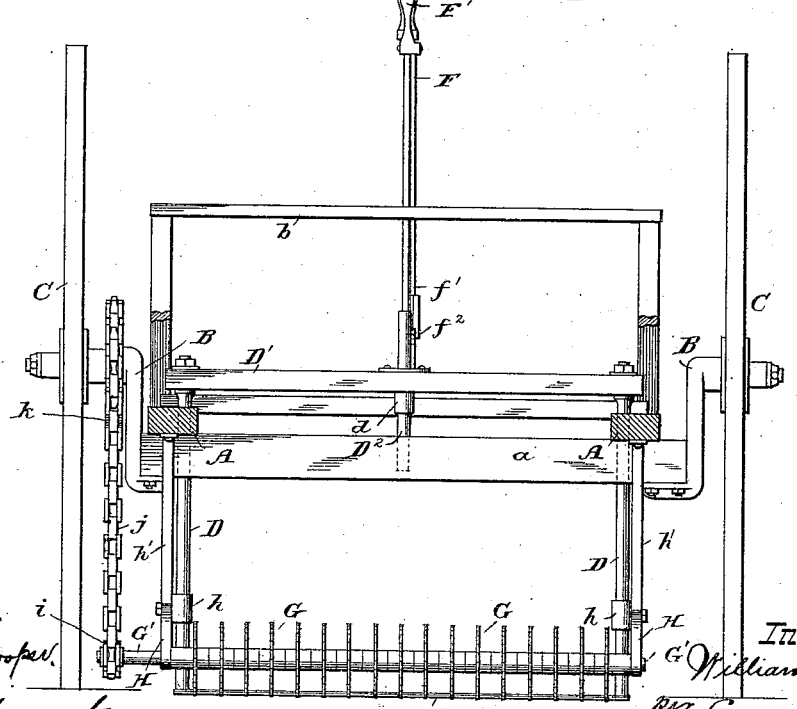
Figure 3:
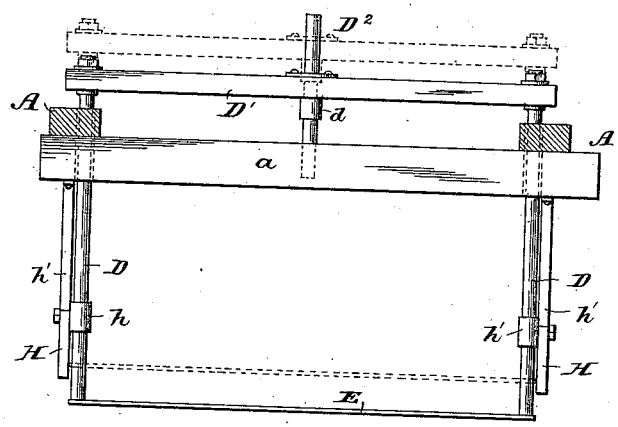
Figure 4:
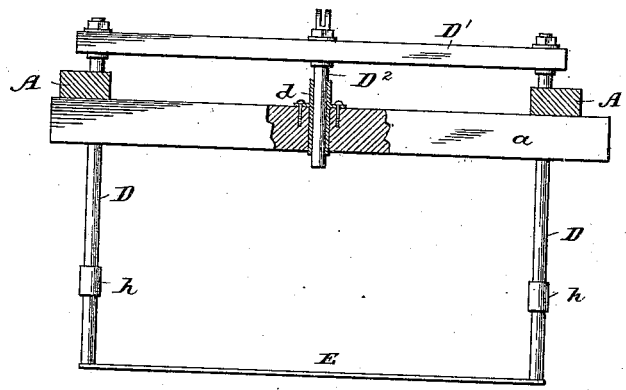
Figure 5:
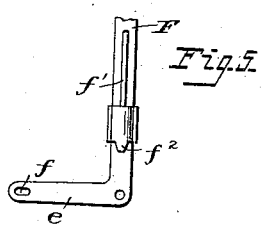

In the accompanying drawings, Figure 1 is a sectional elevation of my cultivator and pulverizer combined. Fig. 2 is a similar view thereof, taken at right angles to the section of Fig. 1, viewing it from the rear. Fig. 3 is a detached side view of the cultivator knife or plow carrying contrivance with the supporting-frame in section, said contrivance also being shown in dotted lines in an elevated position. Fig. 4 is a similar view of the same, slightly modified in the particulars to be hereinafter pointed out; and Fig. 5 is a side detached view of a portion of the actuating lever of the cultivating knife or plow carrying contrivance. Fig. 6 is a sectional elevation of my improvement, showing the pulverizing attachment adjustable. Fig. 7 is a rear sectional elevation with parts broken away. Fig. 8 is a detached side view of the upper driving-belt pulley.

In the embodiment of my invention I employ a suitable supporting-frame, A, horizontally secured or bolted about centrally upon a cross-bar, forming a continuation of and to which are secured or bolted at its under side, near the ends, the lower inwardly-projecting ends of the pendent portions of the short stepped or cranked axles B, bearing the transporting and driving wheels C C. This arrangement permits the disposition of the supporting-frame below the plane of the axles proper, and therefore nearer to the ground than could otherwise be the case, in order, as will be seen further on, to reduce or lessen the length of the supporting carrying rods of the cultivating knife or plow supporting contrivance.

Upon the frame A is supported or mounted (it may be as shown) the driver's or operator's seat $b$.

To the forward end of the frame A are connected or fastened the shafts $c$, or a pole of any preferred construction.

D D are the carrying-rods of the cultivating knife or plow supporting contrivance, which rods, two in number, are extended a short distance forwardly at their lower ends, to which extensions, upon their under sides, is bolted at its ends the cultivating knife or plow E. These rods pass freely up through the axle-bar $a$ and the side bars of the frame A, and are connected together by and bolted to a cross-bar, D', arranged above the said frame, and about centrally through which bar D', or rather through a pendent sleeve, $d$, seated in said bar, passes a guide-rod or pendant, $D^2$, which is screwed or fastened in the axle-bar $a$ at its center. The pendent sleeve or collar $d$ depends from the bar D' and slides or rides with the adjustment of the bar D' upon the guide-rod $D^2$, to provide an extended bearing therefor, and avoids the possibility of the same binding upon the guide-rod, whereby facility and ease of movement of the cultivating knife or plow supporting contrivance are secured.

F is a hand-lever contiguous to the driver's or operator's seat, and formed at its lower end with a rectangular arm, $e$, said lever being also pivoted thereat to a suitable support secured upon the fram, A, while the distant end of the arm $e$ is pivoted to the center of the bar D' at its front side. The pivot-slot of the said arm of lever is somewhat elongated to provide for the requisite movement of the arm upon the pivot thereat, as the bar is moved perfectly perpendicularly and the arm, with its lever, is moved curvilinearly. This lever is provided with a hand-actuated pawl, F', the latter being linked near its upper end similarly to the lever, and having its lower end provided with a weighted or spring clip, f', arranged so as to slide upon the lever and provided with a tooth inside of a guide projection, $f^2$, thereof, which guide projection extends down alongside a segmental rack, g, fastened upon the same support upon which the lever F is pivoted, while said pawl-tooth is adapted to engage with the teeth of said rack, to effect the retention of the lever against movement in holding the cultivating knife or plow supporting contrivance. The weighted clip f enables the pawl-tooth, upon the release of its handled end, to engage automatically or by gravity with the teeth of the rack g, as is desired. The aforesaid cultivating knife or plow supporting contrivance, comprising the rods D fixed to the cross-bar D', and supporting or carrying the cultivating knife or plow E, is, as will have been seen, adapted to be adjusted bodily, all the parts being rigidly connected and moving together as an entirety, whereby minute or nicety of adjustment, can be effected as is necessary, in order to limit the depth of penetration of the knife or plow to cause it to enter and cut or slice the earth just below the surface, to prevent contact with or the cutting of the roots by the knife; this method of cultivation being necessary by reason of the contiguity of the roots to the surface.

The object of slicing the earth, together with pulverizing the same, which latter operation will be described further on, is to freely admit to the roots air and moisture, in order to promote and secure the wholesome growth and maturity of the plant.

G G is a series of closely or finely toothed disks arranged upon a central shaft, G', at short intervals apart, being separated by collars placed upon the said shaft between the said disks with their shaft arranged immediately in rear of the cultivating knife or plow, to supplement the action of the knife or plow, and effect the pulverizing or comminution of the sliced or cut earth, and for the better disturbance and destruction of weeds. The shaft G is hung or supported in the lower apertured ends of curved pendent arms H, bolted to the collars or sleeves h, connected and braced to the frame A by bars or braces, the lower ends of said bars or braces being likewise bolted to the sides of said collars or sleeves, while their upper ends are bolted to the under side of the said frame divergently from each other. These collars or sleeves h are fitted upon the rods D, but permit the latter to move freely through them, and thus serve to brace or strengthen the said rods with the cultivating knife or plow as against rearward displacement or the deflecting out of verticality of the same by the resistance offered to the knife by the earth.

Upon one end of the shaft G' is keyed or secured a toothed or rag wheel, i, which is driven, operating or rotating said shaft and its toothed disks, by an endless chain or belt, j, in turn driven by a larger toothed or sprocket wheel or pulley, k, secured or fast upon one of the short axles or shafts B of the driving and transporting wheels, which rotation of the said toothed disks will have the effect to pulverize or comminute the earth, as above contemplated.

As shown in Figs. 6 and 7, the pulverizing contrivance, in order to accommodate the same to the adjustment of the cultivating plow or knife, is rendered vertically adjustable by the following means: H' is a bail or inverted U-shaped frame with the lower ends of its vertical portions or arms sleeved and secured upon the shaft G' of the pulverizing contrivance, preferably as shown. The said vertical portions or arms of the bail or frame H' are passed through and guided in their movement, as well as braced, by sleeves or tubes $h^2$, formed in the rear arms of the braces h', near the knife-supporting rods or bars D. The upper connecting cross-piece, rod, or bar of the frame or bail H' is also sleeved or pivoted to the rear or outer end of the upwardly and outwardly curved or bent arm e' of a vertical hand-lever, $F^2$, said lever being pivoted to a suitable support or cross-bar of the frame A. The lever $F^2$ in practice is provided with a pawl, f, similar to the pawl of the lever F, which is designed to engage with a rack, g', similar to the rack g, with which the pawl f engages, while said pawl of the lever $F^2$ is adapted to be actuated by hand by a handle-rod, f', linked near its upper end to the said latter lever to effect the adjustment and retention in position of the lever in securing, as against displacement, the pulverizing attachment.

As also shown in Fig. 7, I have provided means to compensate for slack in the driving chain or belt j, that takes place as the pulverizing contrivance is elevated in effecting the adjustment of the same, the description of which means is as follows: k' is a nut fitted, it may be by a screw-thread, to have movement upon one of the short axles B—that adjacent to the driving belt or chain—and provided with the conical externally screw-threaded surface, which screws into the corresponding internally screw-threaded bore of the upper driving-belt pulley, k. The pulley k, in order to permit it to expand to increase its diameter in taking up the slack of the belt under the conditions above mentioned, is made in sections or segments $k^2$, as seen in Fig. 8, and in each segment or section is formed a recess or groove, which grooves or recesses jointly constitute a single or continuous annular groove or recess, $k^3$. Within said groove or recess is arranged a spring, $k^4$. It may be spiral, as shown, or other shape, the normal action of which is to hold said pulley sections or segments flexibly together as well as against radial and lateral displacement.

It will be understood that I do not restrict myself to the particular construction of parts herein shown and described, as, among other changes or variations, I may employ for the series of toothed disks a cylinder having numerous spikes or teeth secured in and throughout its periphery; also, instead of fastening the guide-rod D² to the axle-bar $a$, and permitting the bar D' to ride upon the same, I may fasten the bar D' to the guide-rod D², and allow said rod to ride or move through the axle-bar $a$, as shown in Fig. 4. Other changes, it is obvious, may also be made without departing from the spirit of my invention.

Having thus fully described my invention, what I claim, and desire to secure by Letters Patent, is—

1. The combination, with a wheeled frame, of a pair of vertically-disposed arms passing upward through the axle-bar of said frame and connected together at their upper ends by a horizontal cross-bar, D', a flat horizontal blade or cutter secured to the lower ends of said arms, and a guide-rod connecting the cross-bar and axle-bar, and permitting the vertical movements of said bar and arms, substantially as described.

2. The combination, with a wheeled frame and vertically-moving arms carrying a flat horizontal blade or cutter at their lower ends, of a rotating shaft braced to the blade-arms and carrying a series of pulverizing-disks, and a drive-chain running over a pulley on the shaft, substantially as set forth.

3. The combination, with a wheeled frame and a pair of vertically-disposed arms mounted adjustably in said frame, of a bar connecting the upper ends of said arms, a pivoted operating-lever mounted upon said frame, a flat horizontal blade secured to the lower ends of said arms, and a pair of V-shaped braces carrying sleeves which surround the arms and guide their movement, substantially as specified.

4. The combination, with the frame A, having axle-bar $a$, and bent axle-arms B, and drive-wheel $k$, mounted on one of said arms, of the braces $h'$, carrying sleeves $h\,h^2$, the vertically-adjustable arms D, connected together at their upper ends by cross-bar D', the inverted-U-shaped frame H, carrying shaft G', the knife E at the lower end of arms D, disks G on shaft G', and the pivoted levers F F², with their pawls and pawl-operating handles, and connected, respectively, to the knife-frame and disk-frame, and the drive-chain $j$, all constructed and arranged to operate substantially as described.

In testimony whereof I affix my signature in presence of two witnesses.

WILLIAM SAUNDERS.

Witnesses:
C. S. DRURY,
S. O. EDMONDS.